(12) United States Patent
Ku et al.

(10) Patent No.: US 7,396,382 B2
(45) Date of Patent: Jul. 8, 2008

(54) FUNCTIONALIZED INORGANIC MEMBRANES FOR GAS SEPARATION

(75) Inventors: Anthony Yu-Chung Ku, Rexford, NY (US); James Anthony Ruud, Delmar, NY (US); Jennifer Lynn Molaison, Marietta, GA (US); Louis Andrew Schick, Delmar, NY (US); Vidya Ramaswamy, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 361 days.

(21) Appl. No.: 11/263,165

(22) Filed: Oct. 31, 2005

(65) Prior Publication Data

US 2007/0068382 A1  Mar. 29, 2007

Related U.S. Application Data

(60) Provisional application No. 60/721,560, filed on Sep. 28, 2005.

(51) Int. Cl.
B01D 71/02 (2006.01)

(52) U.S. Cl. ............................................. 95/51; 96/11
(58) Field of Classification Search ................ 96/4–14; 95/51; 428/446, 332, 304.4
See application file for complete search history.

(56) References Cited

U.S. PATENT DOCUMENTS

| | | | |
|---|---|---|---|
| 4,689,150 A * | 8/1987 | Abe et al. .................. 210/490 |
| 5,507,860 A | 4/1996 | Rao et al. | |
| 5,645,891 A | 7/1997 | Liu et al. | |
| 5,772,735 A | 6/1998 | Sehgal et al. | |
| 6,536,604 B1 | 3/2003 | Brinker et al. | |
| 2002/0142172 A1 | 10/2002 | Brinker et al. | |
| 2003/0222015 A1 | 12/2003 | Oyama et al. | |
| 2005/0172811 A1 | 8/2005 | Oyama et al. | |

OTHER PUBLICATIONS

PCT—Mar. 23, 2007.
A. Yamaguchi et al., "Self-assembly of a Silica-surfactant Nanocomposite in a Porous Alumina Membrane", Nature Materials, vol. 3, 337-341, May 2004.
"An Estimate of Surface Mobility of $CO_2$ on $\gamma$-Alumina and MgO-Modified $\gamma$-Alumina Above 500 K" Journal of Colloid and Interface Science 204, 217-218 (1998).
"Synthesis and Characterization of MCM-41-supported $Ba_2SiO_4$ Base Catalyst", Q. Li et al., Microporous and Mesoporous Materials 59, 105-111, (2003).

(Continued)

Primary Examiner—Frank M Lawrence
(74) Attorney, Agent, or Firm—Mary Louise Gioeni

(57) ABSTRACT

A porous membrane for separation of carbon dioxide from a fluid stream at a temperature higher than about 200° C. with selectivity higher than Knudsen diffusion selectivity. The porous membrane comprises a porous support layer comprising alumina, silica, zirconia or stabilized zirconia; a porous separation layer comprising alumina, silica, zirconia or stabilized zirconia, and a functional layer comprising a ceramic oxide contactable with the fluid stream to preferentially transport carbon dioxide. In particular, the functional layer may be MgO, CaO, SrO, BaO, $La_2O_3$, $CeO_2$, $ATiO_3$, $AZrO_3$, $AAl_2O_4$, $A^1FeO_3$, $A^1MnO_3$, $A^1CoO_3$, $A^1NiO_3$, $A^2HfO_3$, $A^3CeO_3$, $Li_2ZrO_3$, $Li_2SiO_3$, $Li_2TiO_3$ or a mixture thereof;
  wherein A is Mg, Ca, Sr or Ba;
  $A^1$ is La, Ca, Sr or Ba;
  $A^2$ is Ca, Sr or Ba; and
  $A^3$ is Sr or Ba.

34 Claims, 2 Drawing Sheets

OTHER PUBLICATIONS

"$CO_2$ Adsorption over Si-MCM-41 Materials having Basic Sites Created by Postmodification with $La_2O_3$", S. Shen, X. Chen and S. Kawi, Americal Chemical Society, pps. (2004).

"Performance and Pore Characterization of Nanoporous Carbon Membranes for Gas Separation", M. Rao, S. Sircar, Journal of Membrane Science 110, pp. 109-118 (1996).

"Separation Characteristics of Tetrapropylammoniumbromide Templating Silica/Alumina Composite Membrane in $CO_2/N_2$, $CO_2/H_2$ and $CH_4/H_2$ Systems", J-H Moon, Hyungwoong Ahn, S-H Hyun and C-H Lee, Korean J. Chem. Eng., 477-487 (2004).

"Separation of $CO_2$ by Modified $\gamma$-$Al_2O_3$ Membranes at High Temperature", Y-K Cho, K-Han, K-H Lee, Journal of Membrane Science 104, pp. 219-230 (1995).

"Separation of $CO_2$ With $BaTiO_3$ Membrane Prepared by the Sol-gel Method", K. Kusakabe, K. Ichiki, S. Morooka, Journal of Membrane Science 95, pp. 171-177 (1994).

"Mesoporous Silica Composites Containing Multiple Regions with Distinct Pore Size and Complex Pore Organization", A. Ku, S. Taylor and S.M. Loureiro, J. Am. Chem. Society, (2005).

Abstract, "Development of Mesoporous Membrane Materials for $CO_2$ Separation", W-H Shih and R. Mutharasan, Dept. of Materials Eng., Drexel University, Philadelphia, Pa., (2001).

P. Yang et al., "Generalized Synthesis of Large-pore Mesoporous Metal Oxides With Semicrystalline Frameworks", Nature, 396, 152-155 (1998).

P. Yang et al., "Block Copolymer Templating Synthesis of Mesoporous Metal oxides with Large Ordering Lengths and Semicrystalline Framework", Chem. Mater., 11, 2813-2826 (1999).

* cited by examiner

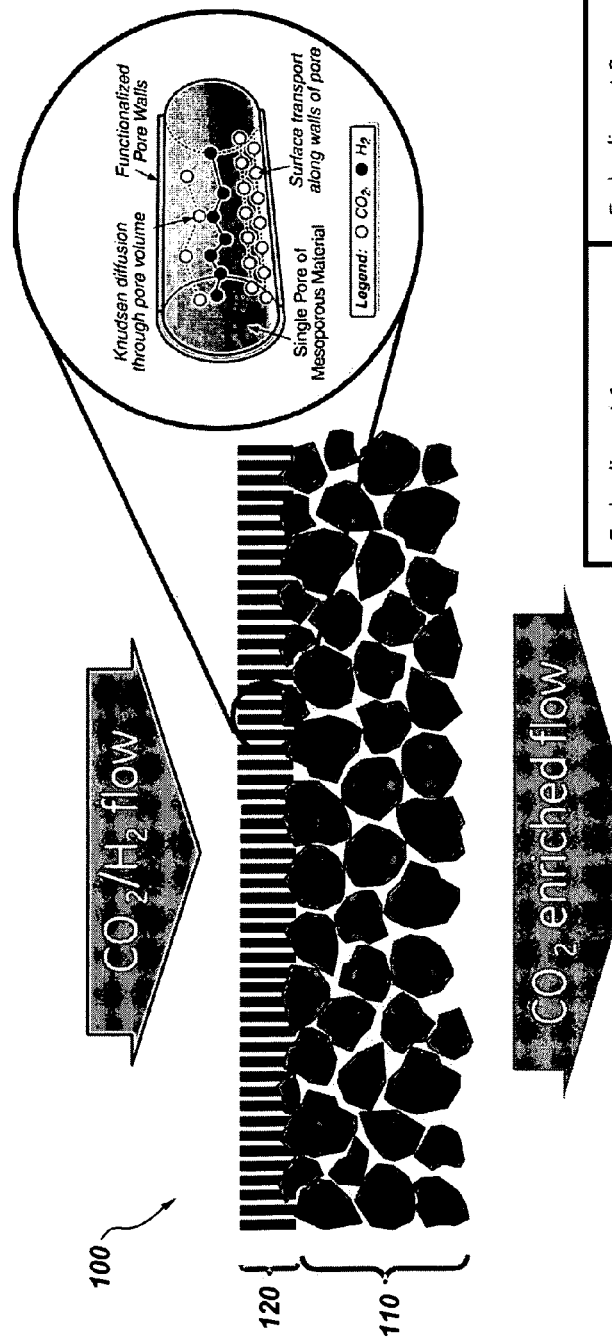
Fig. 1
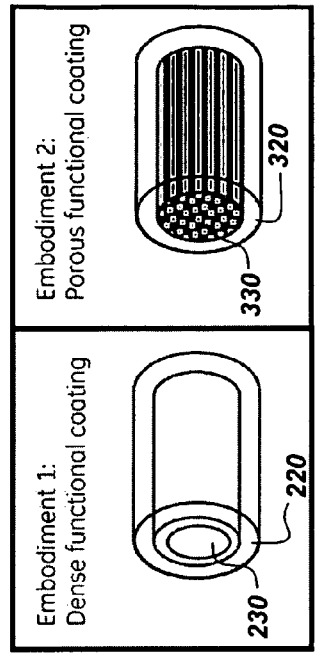
Fig. 2
Fig. 3

FUNCTIONALIZED INORGANIC MEMBRANES FOR GAS SEPARATION

CROSS REFERENCE TO RELATED APPLICATIONS

This application is a non-provisional of and claims priority from U.S. Provisional Patent Application Ser. No. 60/721,560, filed on Sep. 28, 2005, and is related to U.S. patent application Ser. No. 11/263,269, entitled "Methods And Apparatus For Hydrogen Gas Production", filed concurrently herewith. The entire contents of both applications is incorporated herein by reference.

STATEMENT REGARDING FEDERALLY SPONSORED RESEARCH AND DEVELOPMENT

This invention was made with Government support under contract number DOE NETL DE-FC26-05NT42451 awarded by the U.S. Department of Energy. The Government may have certain rights in the invention.

BACKGROUND

The invention relates generally to membranes and methods for separating a gas from a gas stream, and particularly for separating $CO_2$ from a gas stream.

The separation of $CO_2$ from a gas stream is a critical step in the reduction of greenhouse emissions from fossil fuel-based combustion processes. An amine process is used commonly in power plants to scrub the fuel or exhaust gas stream. However, this approach is both energy and capital intensive because the amine process involves cooling the gas stream before scrubbing. Membranes capable of separating $CO_2$ at temperatures above 200° C. could be used in lieu of the amine process in existing plants. They could also be used in advanced integrated gasification combined cycle (IGCC) plants to improve efficiency. To be successful, a membrane must meet two sets of requirements. First, the membrane must be able to selectively separate $CO_2$ from a gas stream. In particular, it is desirable to separate $CO_2$ from $H_2$ in the fuel gas stream or to separate $CO_2$ from $N_2$ in the exhaust gas stream. To achieve separations with a porous membrane, it is often preferable to have reverse selectivity. Reverse selectivity is selectivity in which the heavier gas is enriched relative to the level expected for Knudsen selectivity. Second, the membrane must have an operating temperature above 200° C.

For example, a high temperature membrane having reverse selectivity in separating $CO_2$ and $H_2$ must exhibit mechanical and functional stability up to 500° C. and $CO_2/H_2$ selectivity greater than 10. In addition, $CO_2$ permeabilities of at least 1000 Barrer are desirable. There are no membranes currently available that meet these requirements.

Since $CO_2$ is heavier than the other components of interest in the gas stream, Knudsen diffusion is not a viable mechanism for separation. Knudsen diffusion describes the flow of gas through a membrane in which the pore size is small compared to the mean free path of the gas. The Knudsen diffusion rate is inversely proportional to the molecular weight of the gas. A membrane relying only on Knudsen diffusion would have a $CO_2/H_2$ selectivity of 0.21. Instead, transport must occur through alternate mechanisms that enable the desired selectivity. For example, the most promising polymer membranes are based on a facilitated transport mechanism in which $CO_2$ is selectively transported via amino groups. Those membranes exhibit selectivity of about 10 and permeability of 2000 Barrer at 180° C., but performance rapidly degrades above 180° C. due to dehydration of the membrane. Therefore, polymer membranes are not suitable at higher temperature.

Porous inorganic membranes have the capability for high temperature applications, and selectivity can be endowed through the mechanism of preferential adsorption and surface diffusion of $CO_2$ along the pore walls. Based on this approach, $CO_2/N_2$ selectivity of ~10 have been reported for zeolite, silica, and activated carbon membranes with permeabilities as high as ~$10^4$ Barrer (at room temperature). Recent efforts to develop reverse selective membranes using this strategy have resulted in silica membranes having a measured selectivity of ~5 to 7 with permeability of about 1000 Barrer at 40° C. (Moon, J. H., et al., *Kor. J. Chem. Eng.*, 21, 477-487 (2004)). Up to this point, efforts to develop membranes with enhanced surface transport have focused on identifying a porous material which itself has suitable surface transport properties. The problem with this approach is the limited number of compositions available that satisfy both the structural requirement (well-defined pores) and the transport requirement (fast surface diffusion of $CO_2$). Kusakabe et al. have prepared barium titanate (BTO) layers on porous alumina supports and found a $CO_2/N_2$ selectivity of 1.2 at 500° C. (*J. Membrane Sci.*, 95, 171-177 (1994)). The expected selectivity from Knudsen diffusion is 0.8. However, the membranes contained structural defects in the form of 100 nm pinholes that limited $CO_2$ selectivity.

Accordingly, there remains a need for membranes that can achieve $CO_2/H_2$ selectivity significantly higher than that achievable through Knudsen diffusion mechanisms at high temperatures.

BRIEF DESCRIPTION

It has been unexpectedly discovered that functionalized mesoporous membranes comprising a porous support layer, a well-defined porous separation layer and a surface coating that imparts the desired diffusion characteristics exhibit reverse selectivity in separation of $CO_2$ from $H_2$.

Briefly, in accordance with one embodiment of the present invention, a porous membrane is provided for separation of carbon dioxide from a fluid stream at a temperature higher than about 200° C. with selectivity higher than Knudsen diffusion selectivity. The porous membrane comprises a porous support layer comprising alumina, silica, zirconia or stabilized zirconia; a porous separation layer comprising alumina, silica, zirconia or stabilized zirconia, and a functional layer comprising a ceramic oxide contactable with the fluid stream to preferentially transport carbon dioxide.

In another embodiment, the present invention relates to methods for separating carbon dioxide from a fluid stream at a temperature higher than about 200° C. with selectivity higher than Knudsen diffusion selectivity. The methods comprise contacting a porous membrane according to the present invention with the fluid stream to preferentially transport carbon dioxide.

DRAWINGS

These and other features, aspects, and advantages of the present invention will become better understood when the following detailed description is read with reference to the accompanying drawings in which like characters represent like parts throughout the drawings, wherein:

FIG. 1 is a cross-sectional view of a membrane having a separation layer disposed on the surface of support layer.

FIG. 2 is a schematic view of a single pore of the separation layer wherein a functional layer is disposed on the surface of pore wall in the form of a coating.

FIG. 3 is a schematic view of a single pore of the separation layer wherein a functional layer is disposed within the pore, at least partially filling it.

DETAILED DESCRIPTION

Figure 4:
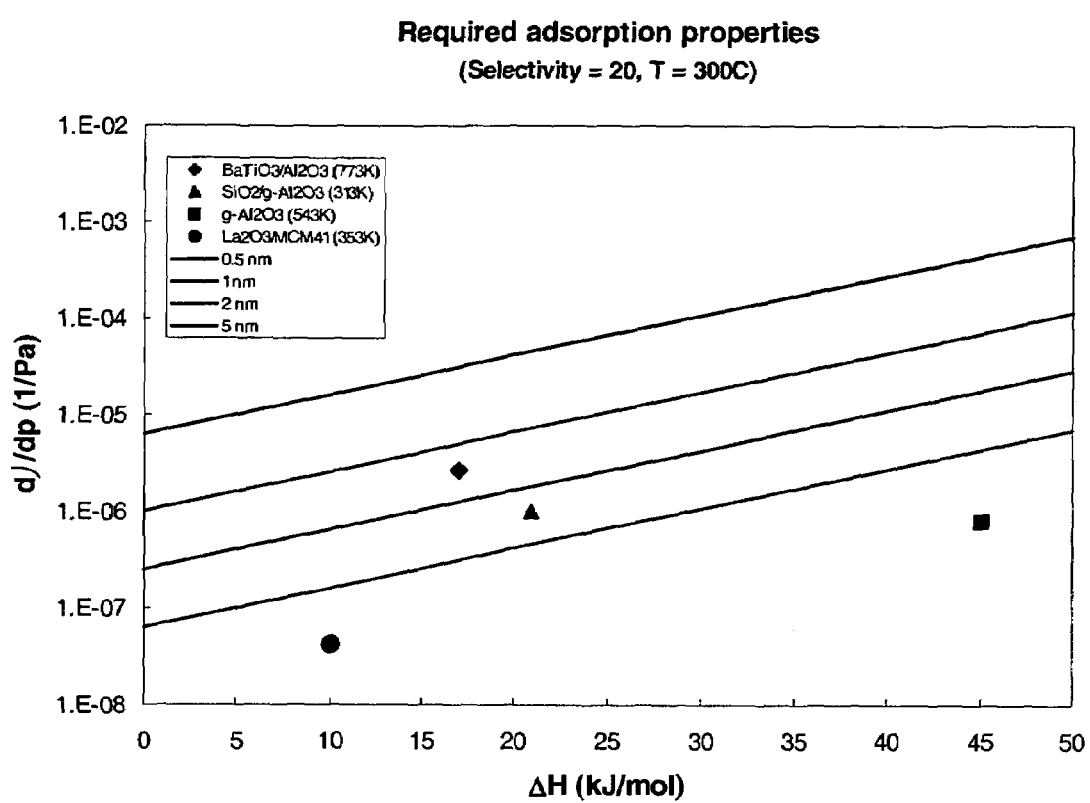
FIG. 4 is a plot of the constraint lines for minimum surface coverage derivative (dθ/dp) and maximum heat of adsorption (ΔH) values needed to achieve a CO2/H2 selectivity of 20.

The present invention relates to porous membranes for separation of carbon dioxide from a fluid stream at a temperature higher than about 200° C. with selectivity higher than Knudsen diffusion selectivity, and to methods for performing such separations using the membranes. For separation of $CO_2$ from a $H_2$-containing gas stream, selectivity due to Knudsen diffusion alone is 0.21. The porous membranes according to embodiments of the present invention enable reverse selectivity in such a separation, yielding selectivity greater than 2, particularly greater than 5, more particularly greater than 10 and most particularly greater than 20.

The porous membranes comprise a porous support layer comprising alumina, silica, zirconia or stabilized zirconia; a porous separation layer comprising alumina, silica, zirconia or stabilized zirconia, and a functional layer comprising a ceramic oxide contactable with the fluid stream to preferentially transport carbon dioxide.

In a particular embodiment, a membrane according to the present invention includes a porous support layer comprising $Al_2O_3$, porous separation layer comprising $SiO_2$ and a functional layer comprising $BaTiO_3$. In another embodiment, the membrane includes a porous support layer comprising $Al_2O_3$, a porous separation layer comprising $Al_2O_3$ and a functional layer comprising $BaTiO_3$.

In yet another embodiment, the present invention relates to methods for separating carbon dioxide from a fluid stream at a temperature higher than about 200° C. with selectivity higher than Knudsen diffusion selectivity. The methods comprise contacting a porous membrane according to an embodiment of the present invention with the fluid stream to preferentially transport carbon dioxide.

FIG. 1 shows a cross-sectional view of a membrane according to one embodiment of the present invention. Membrane 100 includes support layer 110 and separation layer 120 disposed on the surface of support layer 110. Support layer 110 is a porous structure that provides mechanical stability to the membrane. It typically has sufficient mechanical strength to sustain pressure gradients of at least 50 bar. Gas permeability of the support layer is at least two orders of magnitude larger than the separation layer. It is chemically stable in a $CO_2/H_2$ (reducing) atmosphere. Finally, it is thermally stable i.e., having no phase changes, up to about 500° C. The average pore size of support layer 110 ranges from about 100 nm to about 10 microns, particularly about 100 nm to about 1 micron, and more particularly from about 100 nm to about 500 nm.

Separation layer 120 is disposed on the surface of support layer 110 and is bonded thereto. In another embodiment (not shown), the separation layer is porous and is disposed within and at least partially fills the pores of the support layer, and is bonded thereto. In either embodiment, the separation layer provides additional mechanical stability to the membrane and ensures defect-free structures, being free of macroscopic pore defects that allow bypass flow and having high surface area, a narrow pore size distribution, and a well-ordered pore organization. The separation layer is chemically stable in a $CO_2/H_2$ (reducing) atmosphere and is thermally stable, i.e., there is no coarsening of the structure up to about 500° C.

Methods and processes for disposing a separation layer 120 on a support layer 110 are known in the art; some suitable methods are described by T. Tsuru ("Inorganic porous membranes for liquid phase separation," Separation and Purification Methods, v30 (2), 191-220 (2001)). For example, the support layer may be fabricated using powder sintering with green bodies made from extrusion or tape casting, and the separation layer may be co-cast or co-extruded with the support layer and co-sintered. Alternately, the support layer may be sintered and the separation layer disposed on it in a subsequent processing step. Where the support layer has been prepared in a separate process, the separation layer may be fabricated using a wet chemistry process such as a sol-gel process, or a vapor deposition process such as chemical vapor deposition.

The separation layer comprises alumina, silica, zirconia or stabilized zirconia. In particular embodiments, it may be alumina or silica. A mesoporous structure may be produced using a surfactant-templated sol gel approach, on the surface of or within the pores of the support layer. See Kresge, C. T., et al., *Nature*, 359, 710-712 (1992), Yang, P., et al., *Nature*, 396, 152-155 (1998), and Ku, et al., *J. Am. Chem. Soc.*, 127, 6934-6935 (2005).

FIGS. 2 and 3 show a schematic view of a single pore of the separation layer in separate embodiments of the present invention. In FIG. 2, functional layer 230 is disposed on the surface of pore wall 220 in the form of a coating. The functional layer may be partially discontinuous but should provide a continuous path for transport of $CO_2$ on the surface from one side of the membrane to the other/along the length of the pore. In FIG. 3, functional layer 330 is disposed within pore 320, at least partially filling it. In either embodiment, the separation layer may be disposed on the surface of the support layer, or within the pores thereof.

The functional layer provides a continuous path for $CO_2$ to move from one side of the membrane to the other, to enhance the flow of the gas through the membrane. Materials suitable as the functional layer include MgO, CaO, SrO, BaO, $La_2O_3$, $CeO_2$, $TiO_2$, $HfO_2$, $Y_2O_3$, $VO_z$, $NbO_z$, $TaO_z$, $ATiO_3$, $AZrO_3$, $AAl_2O_4$, $A^1FeO_3$, $A^1MnO_3$, $A^1CoO_3$, $A^1NiO_3$, $A^2HfO_3$, $A^3CeO_3$, $Li_2ZrO_3$, $Li_2SiO_3$, $Li_2TiO_3$, $Li_2HfO_3$, $A^4N^1_yO_z$, $Y_xN^1_yO_z$, $La_xN^1_yO_z$, $HfN^2_yO_z$, wherein A is Mg, La, Ca, Sr or Ba; $A^1$ is La, Ca, Sr or Ba; $A^2$ is Ca, Sr or Ba; $A^3$ is Sr or Ba; $A^4$ is Mg, Ca, Sr, Ba, Ti or Zr; $N^1$ is V, Nb, Ta, Cr, Mo, W, Mn, Si or Ge; $N^2$ is V, Mo, W or Si; x is 1 or 2; y is 1-3; and z is 2-7. In particular embodiments, the functional layer may be MgO, CaO, SrO, BaO, $La_2O_3$, $CeO_2$, $Y_2O_3$, $TiO_2$, $ATiO_3$, $AZrO_3$, $AAl_2O_4$, $A^1FeO_3$, $A^1MnO_3$, $A^1CoO_3$, $A^1NiO_3$, $A^2HfO_3$, $A^3CeO_3$, $Li_2ZrO_3$, $Li_2SiO_3$, $Li_2TiO_3$, and mixtures thereof. In particular embodiments, the functional layer may be MgO, CaO, $La_2O_3$, $Y_2O_3$, $CeO_2$, $TiO_2$, $ATiO_3$, $AZrO_3$, $AAl_2O_4$, $A_1FeO_3$ or a mixture thereof. More particularly, it may be MgO, $CeO_2$, $ATiO_3$, $A^1FeO_3$, $AZrO_3$ or a mixture thereof. Most particularly, it may be $BaTiO_3$, $BaZrO_3$, $LaFeO_3$ or a mixture thereof. In a specific embodiment, the functional layer is $BaTiO_3$.

The functional layer may be a dense coating disposed on surfaces of pores of the separation layer as in FIG. 2, or it may be porous and disposed within and at least partially filling pores of the separation layer, as in FIG. 3. The embodiment of FIG. 3 may be advantageous in situations where it is possible to make porous structures composed of the desired surface functional material, but it is difficult to produce them as a defect-free membrane. One example of a membrane according to the embodiment shown in FIG. 3 is a 1 nm porous barium titanate functional layer embedded in a 10 nm mesoporous silica separation layer, embedded in a 200 nm pore anodic alumina support layer.

Methods for preparing a dense functional layer disposed on pore surfaces or a porous functional layer disposed within the pore include sol-gel techniques, wet impregnation techniques (incipient wetness; including melt infiltration), electrophoretic deposition, chemical vapor deposition, including metal organic CVD, physical vapor deposition, including evaporation and sputtering, and atomic layer deposition.

The effective average pore size of the membrane ranges from about 0.5 nm to about 60 nm, particularly from about 1 nm to about 10 nm, and more particularly from 1 nm to about 5 nm. In embodiments where a dense functional layer is disposed on the surfaces of the pores of the separation layer, 'effective average pore size' refers to the pore size of the layer after it has been coated by the functional layer. That is, the limiting pore size is the region defined by the functional layer after it coats the separation layer pores. In embodiments where a porous functional layer is disposed within the pores of the separation layer, 'effective average pore size' refers to the pore size of the functional layer. Pore size distribution is narrow to reduce dispersion in Knudsen flow. A narrow pore size distribution is defined as average pore size distribution that does not vary by more than about 100% when the average pore size is in a range from about 2 nm to about 50 nm, and an average pore size distribution that does not vary by more than about 50% when the average pore size is greater than about 50 nm.

In combination with the separation layer, the functional layer provides the overall gas selectivity of the membrane. Flow through the membrane is due to the sum of contributions from Knudsen flow through the pores and surface flow of adsorbed gas along the pore walls. For embodiments where the functional layer is disposed on surfaces of pores of the separation layer, the pore size for Knudsen flow is the size of the pores of the separation layer, reduced by the thickness of the surface functional coating. For embodiments where the functional layer is disposed within and at least partially filling pores of the separation layer, the pore size for Knudsen flow is the effective pore size.

The gas selectivity through the membrane is determined by the relative contributions of Knudsen flow and surface diffusion to the total transport of gas. To achieve reverse selectivity in a gas stream containing $CO_2$ and $H_2$, surface diffusion makes a significant contribution to the total $CO_2$ transport. The rate of surface diffusion depends on the amount of $CO_2$ adsorbed and its relative mobility.

To a first approximation, the surface diffusivity of a gas on a material can be estimated from the heat of adsorption. Since the diffusivity varies exponentially with the negative of the heat of adsorption, materials with lower heats of adsorption exhibit higher surface diffusivity. Physically, this means that materials for the functional layer have a greater affinity for $CO_2$ than for $H_2$, but the affinity for $CO_2$ is not so great that the $CO_2$ binds to the surface without transporting through the pore channel. Low heats of adsorption correspond to weakly bonded $CO_2$ which favors high diffusivities. Accordingly, materials that are suitable for use as the functional layer are characterized by high surface coverage derivative ($d\theta/dp$) and low heat of adsorption ($\Delta H$). These properties can be determined from $CO_2$ adsorption isotherms of the materials. In the context of the present invention, high surface coverage derivative and low heat of adsorption favor high surface transport fluxes when the material is formed into a membrane. Materials that are suitable for use as the functional layer possess a combination of $d\theta/dp$ and $\Delta H$ that falls above a line defining the minimum surface coverage derivative ($d\theta/dp$) and maximum heat of adsorption ($\Delta H$) values needed to obtain the desired molar selectivity under specific conditions. These values may be determined using the following analysis:

Molar selectivity can be computed from the material properties of the surface functional layer, the pore structure, and the operating conditions. Mathematically, the molar selectivity, $S_{CO2/H2}$, is:

$$S_{CO2/H2} = \frac{P_{surf} + P_{Kn,CO2}}{P_{Kn,H2}} \quad (1)$$

The permeability of surface diffusion, $P_{surf}$ is given by:

$$P_{surf} = \frac{2\varepsilon}{\tau r A N_A} \frac{d\theta}{dp} D_s = \frac{2\varepsilon}{\tau r A N_A} \frac{d\theta}{dp} D_{s0} \exp\left(-\frac{a\Delta H}{RT}\right) \quad (2)$$

where $\varepsilon$ is the porosity, $\tau$ is the tortuosity, r is the pore radius, A is the surface area occupied by adsorbed $CO_2$, $N_A$ is Avogadro's number, $\theta$ is the surface coverage, p is the partial pressure of $CO_2$, $D_s$ is the surface diffusion coefficient, R is the ideal gas constant, T is temperature, and a and $D_{s0}$ are diffusion constants.

The permeability of Knudsen diffusion for $CO_2$ and $H_2$, respectively are:

$$P_{Kn,CO2} = \frac{2\varepsilon r}{3RT} \sqrt{\frac{8RT}{\pi M_{CO2}}} \quad (3)$$

$$P_{Kn,H2} = \frac{2\varepsilon r}{3RT} \sqrt{\frac{8RT}{\pi M_{H2}}} \quad (4)$$

where $M_{CO2}$ and $M_{H2}$ are the molecular masses of $CO_2$ and $H_2$.

Substituting equations (1) to (3) into (4) and solving for $d\theta/dp$ gives:

$$\frac{d\theta}{dp} = \frac{\tau r A N_A}{2\varepsilon D_{S0}} \exp\left(\frac{a\Delta H}{RT}\right) \left[\frac{2\varepsilon r}{3RT} \left(S_{CO2/H2} \sqrt{\frac{8RT}{\pi M_{H2}}} - \sqrt{\frac{8RT}{\pi M_{CO2}}}\right)\right] \quad (5)$$

The following numerical values were used to generate the curves in FIG. 4:

| | | |
|---|---|---|
| $\varepsilon = 0.5$ | $\tau = 1$ | $A = 1.95e-19\ m^2$ |
| $N_A = 6.02e23$ molecules/mol | $R = 8.314$ J/mol/K | $T = 573K$ |
| $r = (0.5, 1, 2, 5)$ nm | $a = 0.45$ | $D_{s0} = 1.6e-6\ m^2/s$ |
| $M_{CO2} = 0.044$ kg/mol | $M_{H2} = 0.002$ kg/mol | $S_{CO2/H2} = 20$. |

The analysis assumes that all pores are straight cylinders with a uniform pore radius, and that surface diffusion is a Fickian process with Arrhenius-type transport from one site to the next. Diffusion constants of chemisorbed molecules are taken to be comparable to those for physisorbed molecules;

the partial pressure difference across the membrane is treated as negligible, and the heat of adsorption is taken to be the activation energy for surface diffusion. Assuming $d\theta/dp$ to be constant across the membrane simplifies the calculation.

FIG. 4 shows the constraint lines for minimum surface coverage derivative ($d\theta/dp$) and maximum heat of adsorption ($\Delta H$) values needed to obtain a molar $CO_2/H_2$ selectivity of 20 at 300° C., for pore radii of 0.5 nm, 1 nm, 2 nm and 5 nm. Materials for use under these conditions possess a combination of $d\theta/dp$ and $\Delta H$ that fall above the constraint line. This line shifts upward with increasing pore radius, making it more difficult to achieve the desired selectivity in structures with larger pores. Physically, this is due to the higher degree of surface diffusion needed to offset the increased Knudsen flow through the larger pores. Therefore, membrane according to the present invention, having small pores and functional layers with high $d\theta/dp$ and low $\Delta H$, exhibit enhanced $CO_2/H_2$ selectivity.

Benchmark surface adsorption property values for alumina, silica, lanthanum oxide and barium titanate (BTO) are shown on the graph in FIG. 4. In particular, BTO possesses a combination of $d\theta/dp$ and $\Delta H$ at 500° C. that falls above the constraint line for a membrane with 1 nm radius pores.

While the foregoing analysis relates to separation of $CO_2$ from $H_2$, the surface functionalization approach described is capable of removing $CO_2$ from other gases, such as $N_2$, $O_2$, and $CH_4$. This approach is also capable of removing other gases such as $H_2S$ through enhanced surface diffusion. However, the effective surface permeability will differ for each gas due to dissimilar heats of adsorption (and consequently, surface diffusivities). Appropriate selectivity may be achieved through the identification of a material with comparable (and low) heats of adsorption for the gases to be removed.

EXAMPLES

Example 1

Dense Barium Titanate Functional Layer on Alumina Separation Layer

A dense layer of barium titanate (BTO) for use as the functional layer is coated on the pores of anodic alumina using the procedure described by Hernandez, et al. (Hernandez, B. A.; Chang, K.-S.; Fisher, E. R.; Dorhout, P. K. *Chem. Mater.*, 2002, 14, 480-482). The thickness of the coating is adjusted to achieve the desired effective pore size. BTO has $d\theta/dp=2.6e-6$ $Pa^{-1}$ (at 0.4 atm $CO_2$ partial pressure) and $\Delta H_{SiO2}=17$ kJ/mol. A porous structure with 10 nm pores has selectivity ranging from 0.28 at 25° C. to 0.94 at 500° C. A porous structure with 5 nm pores has selectivity ranging from 0.48 at 25° C. to 3.1 at 500° C. A porous structure with 2 nm pores has selectivity ranging from 1.9 at 25° C. to 18.4 at 500° C.

Example 2

Porous Silica Separation Layer within Pores of Alumina Support Layer

To prepare the separation layer, a macroporous anodic aluminum oxide membrane (AAO, 200 nm diameter macropores) was immersed in an acidified ethanol-based precursor solution containing a surfactant template and an alkoxide ceramic precursor. Cetyltrimethylammonium chloride (CTAC) and nonionic block copolymers (EO20PO70EO20 [Pluronic P123] and EO106PO70EO106 [Pluronic F127]) were used as the templates and tetraethoxysilane (TEOS) as the silica precursor. The AAO macropores were filled by evaporation-driven gelation of the precursor solution. The sample was then heated to 600° C. to remove the surfactant template, shrink the ceramic deposits between growth stages, and allow deposition of additional porous regions. After heating, the membrane was recycled through the process to deposit additional material.

Example 3

Porous Titania Functional Layer within Pores of Alumina Separation Layer

A macroporous anodic aluminum oxide membrane (AAO, 200 nm diameter macropores) was immersed in an acidified ethanol-based precursor solution containing a surfactant template and an alkoxide ceramic precursor. Nonionic block copolymers (EO20PO70EO20 [Pluronic P123] and EO106PO70EO106 [Pluronic F127]) were used as the templates and titanium (IV) ethoxide as the silica precursor. The AAO macropores were filled by evaporation-driven gelation of the precursor solution. The sample was then heated to 400° C. to remove the surfactant template. P123 polymer (1.0 g) was completely dissolved in 12 g of ethanol. Concurrently, 0.2 g of distilled water was added to 3.0 g concentrated HCl, followed by the addition of 4.2 g of titanium (IV) ethoxide. The solution partially gelled upon addition of the titanium ethoxide, but it re-dissolved after about 30 minutes of stirring. These solutions were combined, stirred and loaded into a Petri dish. The anodic alumina membrane was immersed in the solution for 10 hours and was subsequently removed and heated in air at 400° C. for 4 hours to remove the template. The gas permeability of the sample was measured to demonstrate a continuous path for gas flow through the mesoporous titania structure. An air permeability of $1 \cdot 10^{-9}$ mol/s/Pa/m was measured at 84° F. (29° C.).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A porous membrane for separation of carbon dioxide from a fluid stream at a temperature higher than about 200° C. with selectivity higher than Knudsen diffusion selectivity; said porous membrane comprising
    a porous support layer comprising alumina, silica, zirconia or stabilized zirconia;
    a porous separation layer comprising alumina, silica, zirconia or stabilized zirconia, and
    a functional layer comprising a ceramic oxide contactable with the fluid stream to preferentially transport carbon dioxide.

2. A porous membrane according to claim 1, wherein the porous separation layer is disposed on a surface of the porous support layer.

3. A porous membrane according to claim 1, wherein the porous separation layer is disposed within and at least partially fills pores of the porous support layer.

4. A porous membrane according to claim 1, wherein the functional layer is disposed on surfaces of pores of the porous separation layer.

5. A porous membrane according to claim 1, wherein the functional layer is porous, and is disposed within and at least partially fills pores of the porous separation layer.

6. A porous membrane according to claim 1, wherein the porous separation layer is disposed on a surface of the porous support layer, and the functional layer is porous and is disposed within and at least partially fills pores of the porous separation layer.

7. A porous membrane according to claim 1, wherein the porous separation layer is disposed on a surface of the porous support layer; and the functional layer is disposed on surfaces of pores of the porous separation layer.

8. A porous membrane according to claim 1, wherein the porous separation layer is disposed within and at least partially fills pores of the porous support layer; and the functional layer is disposed on surfaces of pores of the porous separation layer.

9. A porous membrane according to claim 1, wherein the functional layer comprises MgO, CaO, SrO, BaO, $La_2O_3$, $CeO_2$, $TiO_2$, $HfO_2$, $Y_2O_3$, $VO_2$, $NbO_2$, $TaO_2$, $ATiO_3$, $AZrO_3$, $AAl_2O_4$, $A^1FeO_3$, $A^1MnO_3$, $A^1CoO_3$, $A^1NiO_3$, $A^2HfO_3$, $A^3CeO_3$, $Li_2ZrO_3$, $Li_2SiO_3$, $Li_2TiO_3$, $Li_2HfO_3$, $A^4N^1_yO_z$, $Y_xN^1_yO_z$, $La_xN^1_yO_z$, $HfN^2_yO_z$, or a mixture thereof wherein A is La, Mg, Ca, Sr or Ba;
- $A^1$ is La, Ca, Sr or Ba;
- $A^2$ is Ca, Sr or Ba;
- $A^3$ is Sr or Ba;
- $A^4$ is Mg, Ca, Sr, Ba, Ti or Zr;
- $N^1$ is V, Nb, Ta, Cr, Mo, W, Mn, Si or Ge;
- $N^2$ is V, Mo, W or Si;
- x is 1 or 2;
- y is in the range from 1 to 3; and
- z is in the range from 2 to 7.

10. A porous membrane according to claim 1, wherein the functional layer comprises MgO, CaO, SrO, BaO, $La_2O_3$, $CeO_2$, $TiO_2$, $Y_2O_3$, $ATiO_3$, $AZrO_3$, $AAl_2O_4$, $A^1FeO_3$, $A^1MnO_3$, $A^1CoO_3$, $A^1NiO_3$, $A^2HfO_3$, $A^1CeO_3$, $Li_2ZrO_3$, $Li_2SiO_3$, $Li_2TiO_3$ or a mixture thereof;
- wherein A is Mg, Ca, Sr or Ba;
- $A^1$ is La, Ca, Sr or Ba;
- $A^2$ is Ca, Sr or Ba; and
- $A^3$ is Sr or Ba.

11. A porous membrane according to claim 1, wherein the functional layer comprises MgO, CaO, $La_2O_3$, $Y_2O_3$, $CeO_2$, $TiO_2$, $ATiO_3$, $AZrO_3$, $AAl_2O_4$, $A^1FeO_3$ or a mixture thereof;
- wherein A is La, Mg, Ca, Sr or Ba; and
- $A^1$ is La, Ca, Sr or Ba.

12. A porous membrane according to claim 1, wherein the functional layer comprises MgO, $CeO_2$, $ATiO_3$, $A^1FeO_3$, $AZrO_3$ or a mixture thereof;
- wherein A is La, Mg, Ca, Sr or Ba; and
- $A^1$ is La, Ca, Sr or Ba.

13. A porous membrane according to claim 1, wherein the functional layer comprises $BaTiO_3$, $BaZrO_3$, $LaFeO_3$ or a mixture thereof.

14. A porous membrane according to claim 1, wherein the functional layer comprises $BaTiO_3$.

15. A porous membrane according to claim 1, wherein the porous support layer comprises alumina.

16. A porous membrane according to claim 1, wherein the porous separation layer comprises alumina.

17. A porous membrane according to claim 1, wherein the porous separation layer comprises silica.

18. A porous membrane according to claim 9, wherein the porous support layer comprises alumina, the porous separation layer comprises silica and the functional layer comprises $BaTiO_3$.

19. A porous membrane according to claim 1, wherein the porous support layer comprises alumina, the porous separation layer comprises alumina and the functional layer comprises $BaTiO_3$.

20. A porous membrane according to claim 1, wherein average pore size of the porous support layer ranges from about 100 nm to about 10 microns.

21. A porous membrane according to claim 1 wherein average pore size of the porous support layer ranges from about 100 nm to about 1 micron.

22. A porous membrane according to claim 1 wherein effective average pore size of the porous separation layer ranges from about 0.5 nm to about 60 nm.

23. A porous membrane according to claim 1 wherein effective average pore size of the porous separation layer ranges from about 1 nm to about 10 nm.

24. A porous membrane for separation of carbon dioxide from a fluid stream at a temperature higher than about 200° C. with selectivity higher than Knudsen diffusion selectivity; said porous membrane comprising
- a porous support layer comprising alumina, silica, zirconia or stabilized zirconia;
- a porous separation layer comprising alumina, silica, zirconia or stabilized zirconia, and disposed on a surface of the porous support layer; and
- a functional layer disposed on surfaces of pores of the porous separation layer and contactable with the fluid stream to preferentially transport carbon dioxide, the functional layer comprising MgO, CaO, SrO, BaO, $La_2O_3$, $CeO_2$, $TiO_2$, $Y_2O_3$, $ATiO_3$, $AZrO_3$, $AAl_2O_4$, $A^1FeO_3$, $A^1MnO_3$, $A^1CoO_3$, $A^1NiO_3$, $A^2HfO_3$, $A^3CeO_3$, $Li_2ZrO_3$, $Li_2SiO_3$, $Li_2TiO_3$ or a mixture thereof;
- wherein A is Mg, Ca, Sr or Ba;
- $A^1$ is La, Ca, Sr or Ba;
- $A^2$ is Ca, Sr or Ba; and
- $A^3$ is Sr or Ba.

25. A porous membrane for separation of carbon dioxide from a fluid stream at a temperature higher than about 200° C. with selectivity higher than Knudsen diffusion selectivity; said porous membrane comprising
- a porous support layer comprising alumina, silica, zirconia or stabilized zirconia;
- a porous separation layer comprising alumina, silica, zirconia or stabilized zirconia, and disposed on a surface of the porous support layer; and
- a porous functional layer disposed within and at least partially filling pores of the porous separation layer, and contactable with the fluid stream to preferentially transport carbon dioxide, the functional ceramic layer comprising MgO, CaO, SrO, BaO, $La_2O_3$, $CeO_2$, $TiO_2$, $Y_2O_3$, $ATiO_3$, $AZrO_3$, $AAl_2O_4$, $A^1FeO_3$, $A^1MnO_3$, $A^1CoO_3$, $MnO_3$, $A^1CoO_3$, $A^1NiO_3$, $A^2HfO_3$, $A^3CeO_3$, $Li_2ZrO_3$, $Li_2SiO_3$, $Li_2TiO_3$ or a mixture thereof;
- wherein A is Mg, Ca, Sr or Ba;
- $A^1$ is La, Ca, Sr or Ba;
- $A^2$ is Ca, Sr or Ba; and
- $A^3$ is Sr or Ba.

26. A porous membrane for separation of carbon dioxide from a fluid stream at a temperature higher than about 200° C. with selectivity higher than Knudsen diffusion selectivity; said porous membrane comprising
- a porous support layer comprising alumina, silica, zirconia or stabilized zirconia;

a porous separation layer comprising alumina, silica, zirconia or stabilized zirconia, and disposed within and at least partially filling pores of the porous support layer; and a functional layer disposed on surfaces of pores of the porous separation layer, and contactable with the fluid stream to preferentially transport carbon dioxide, the functional layer comprising MgO, CaO, SrO, BaO, $La_2O_3$, $CeO_2$, $TiO_2$, $Y_2O_3$, $ATiO_3$, $AZrO_3$, $AAl_2O_4$, $A^1FeO_3$, $A^1MnO_3$, $A^1CoO_3$, $A^1NiO_3$, $A^2HfO_3$, $A^3CeO_3$, $Li_2ZrO_3$, $Li_2SiO_3$, $Li_2TiO_3$ or a mixture thereof;

wherein A is Mg, Ca, Sr or Ba;
$A^1$ is La, Ca, Sr or Ba;
$A^2$ is Ca, Sr or Ba; and
$A^3$ is Sr or Ba.

27. A method for separating carbon dioxide from a fluid stream at a temperature higher than about 200° C. with selectivity higher than Knudsen diffusion selectivity, said method comprising contacting a porous membrane with the fluid stream to preferentially transport carbon dioxide thereacross, the porous membrane comprising a porous support layer comprising alumina, silica, zirconia or stabilized zirconia;

a porous separation layer comprising alumina, silica, zirconia or stabilized zirconia, and a functional layer comprising MgO, CaO, SrO, BaO, $La_2O_3$, $CeO_2$, $TiO_2$, $Y_2O_3$, $ATiO_3$, $AZrO_3$, $AAl_2O_4$, $A^1FeO_3$, $A^1MnO_3$, $A^1CoO_3$, $A^1NiO_3$, $A^2HfO_3$, $A^3CeO_3$, $Li_2ZrO_3$, $Li_2SiO_3$, $Li_2TiO_3$ or a mixture thereof;

wherein A is Mg, Ca, Sr or Ba;
$A^1$ is La, Ca, Sr or Ba;
$A^2$ is Ca, Sr or Ba; and
$A^3$ is Sr or Ba.

28. A porous membrane for separation of carbon dioxide from a fluid stream at a temperature higher than about 200° C. with selectivity higher than Knudsen diffusion selectivity; said porous membrane comprising a porous support layer comprising alumina, silica, zirconia or stabilized zirconia;

a porous separation layer comprising alumina, silica, zirconia or stabilized zirconia, and a functional layer comprising MgO, CaO, SrO, BaO, $La_2O_3$, $CeO_2$, $TiO_2$, $Y_2O_3$, $ATiO_3$, $AZrO_3$, $AAl_2O_4$, $A^1FeO_3$, $A^1MnO_3$, $A^1CoO_3$, $A^1NiO_3$, $A^2HfO_3$, $A^3CeO_3$, $Li_2ZrO_3$, $Li_2SiO_3$, $Li_2TiO_3$ or a mixture thereof;

wherein A is Mg, Ca, Sr or Ba;
$A^1$ is La, Ca, Sr or Ba;
$A^2$ is Ca, Sr or Ba; and
$A^3$ is Sr or Ba.

29. A porous membrane according to claim 28, wherein the porous support layer comprises alumina.

30. A porous membrane according to claim 28, wherein the porous separation layer comprises alumina.

31. A porous membrane according to claim 28, wherein the porous separation layer comprises silica.

32. A porous membrane according to claim 28, wherein the functional layer comprises $BaTiO_3$.

33. A porous membrane according to claim 28, wherein the porous support layer comprises alumina, the porous separation layer comprises silica and the functional layer comprises $BaTiO_3$.

34. A porous membrane according to claim 28, wherein the porous support layer comprises alumina, the porous separation layer comprises $Al_2O_3$ and the functional layer comprises $BaTiO_3$.

* * * * *

UNITED STATES PATENT AND TRADEMARK OFFICE
CERTIFICATE OF CORRECTION

PATENT NO. : 7,396,382 B2  Page 1 of 1
APPLICATION NO. : 11/263165
DATED : July 8, 2008
INVENTOR(S) : Anthony Yu-Chung Ku et al.

It is certified that error appears in the above-identified patent and that said Letters Patent is hereby corrected as shown below:

In Claim 25, Column 10, Line 54 [[$A^1NiO^3$]] should read --$A^1NiO_3$--.

and also

In Claim 25, Column 10, Line 54 "$MnO_3$" should be removed. It was not in the original Patent Application.

Signed and Sealed this

Twenty-third Day of September, 2008

JON W. DUDAS
*Director of the United States Patent and Trademark Office*